US008839856B2

(12) United States Patent
Becker

(10) Patent No.: US 8,839,856 B2
(45) Date of Patent: Sep. 23, 2014

(54) ELECTROMAGNETIC WAVE TREATMENT METHOD AND PROMOTER

(75) Inventor: Harold L. Becker, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 507 days.

(21) Appl. No.: 13/088,014

(22) Filed: Apr. 15, 2011

(65) Prior Publication Data

US 2012/0261129 A1    Oct. 18, 2012

(51) Int. Cl.
*E21B 37/06*    (2006.01)
*E21B 43/22*    (2006.01)

(52) U.S. Cl.
USPC ............................ 166/248; 166/279; 166/304

(58) Field of Classification Search
None
See application file for complete search history.

(56) References Cited

U.S. PATENT DOCUMENTS

| | | | |
|---|---|---|---|
| 4,193,451 A | 3/1980 | Dauphine | |
| 4,320,801 A | 3/1982 | Rowland et al. | |
| 4,620,593 A | 11/1986 | Haagensen | |
| 4,817,711 A | 4/1989 | Jeambey | |
| 4,819,723 A | 4/1989 | Whitfill et al. | |
| 4,862,060 A | 8/1989 | Scott et al. | |
| 4,865,747 A | 9/1989 | Larson et al. | |
| 4,884,634 A | 12/1989 | Ellingsen | |
| 4,902,961 A | 2/1990 | De et al. | |
| 4,904,942 A | 2/1990 | Thompson | |
| 4,926,941 A | 5/1990 | Glandt et al. | |
| 4,973,811 A | 11/1990 | Bass | |
| 5,012,868 A | 5/1991 | Bridges | |
| 5,014,010 A | 5/1991 | Helms et al. | |
| 5,046,559 A | 9/1991 | Glandt | |
| 5,049,823 A | 9/1991 | Castel et al. | |
| 5,055,180 A | 10/1991 | Klaila | |
| 5,065,819 A | 11/1991 | Kasevich | |
| 5,076,727 A | 12/1991 | Johnson et al. | |
| 5,082,054 A | 1/1992 | Kiamanesh | |
| 5,107,219 A | 4/1992 | Marrelli et al. | |
| 5,109,927 A | 5/1992 | Supernaw et al. | |
| 5,114,497 A | 5/1992 | Johnson et al. | |
| 5,120,135 A * | 6/1992 | Ullman ........................ | 366/273 |
| 5,236,039 A | 8/1993 | Edelstein et al. | |
| 5,282,508 A | 2/1994 | Ellingsen et al. | |
| 5,293,936 A | 3/1994 | Bridges | |
| 5,299,887 A | 4/1994 | Ensley | |
| 5,323,855 A | 6/1994 | Evans | |
| 5,351,521 A | 10/1994 | Cracknell | |
| 5,370,477 A | 12/1994 | Bunin et al. | |
| 5,449,889 A | 9/1995 | Samardzija | |
| 5,453,693 A | 9/1995 | Sinclair et al. | |
| 5,484,985 A | 1/1996 | Edelstein et al. | |
| 5,485,743 A | 1/1996 | Taherian et al. | |
| 5,507,927 A | 4/1996 | Emery | |
| 5,514,283 A | 5/1996 | Stefanini | |
| 5,531,270 A | 7/1996 | Fletcher et al. | |
| 5,574,815 A | 11/1996 | Kneeland | |
| 5,667,677 A | 9/1997 | Stefanini | |
| 5,723,844 A | 3/1998 | Dow et al. | |
| 5,763,794 A | 6/1998 | Marrelli | |
| 5,829,519 A | 11/1998 | Uthe | |
| 5,877,995 A | 3/1999 | Thompson et al. | |
| 5,969,209 A | 10/1999 | Katoot | |
| 6,012,520 A | 1/2000 | Yu et al. | |
| 6,189,611 B1 | 2/2001 | Kasevich | |
| 6,192,752 B1 | 2/2001 | Blaine | |
| 6,250,386 B1 | 6/2001 | Ellingsen | |
| 6,307,191 B1 | 10/2001 | Waycuilis | |
| 6,350,973 B2 | 2/2002 | Wroe et al. | |
| 6,412,555 B1 | 7/2002 | Sten-Halvorsen et al. | |
| 6,427,774 B2 | 8/2002 | Thomas et al. | |
| 6,499,536 B1 | 12/2002 | Ellingsen | |
| 6,541,979 B2 | 4/2003 | Omeragic | |
| 6,617,556 B1 | 9/2003 | Wedel | |
| 6,629,562 B1 | 10/2003 | Fidan | |
| 6,650,280 B2 | 11/2003 | Arndt et al. | |
| 6,658,944 B2 | 12/2003 | Melnikov et al. | |
| 6,667,620 B2 | 12/2003 | Homan et al. | |

(Continued)

FOREIGN PATENT DOCUMENTS

| | | |
|---|---|---|
| GB | 896407 A1 | 5/1962 |
| WO | WO 0103473 A1 | 1/2001 |

(Continued)

OTHER PUBLICATIONS

Arthur Unknown; "HydroFLOW Theory of Operation"; website http://www.hydroflow.force9.co.uk/theory.htm, visited Sep. 5, 2007; 2 pages.

Bennion, D.B., et al., "Low Permeability Gas Reservoirs: Problems, Opportunities and Solutions for Drilling, Completion, Stimulation and Production", Society of Petroleum Engineers, Inc., SPE Gas Technology Symposium, 1996, p. 117-131.

(Continued)

*Primary Examiner* — Zakiya W Bates

(74) *Attorney, Agent, or Firm* — McGlinchey Stafford; R. Andrew Patty, II; Mary H. Drabnis

(57) ABSTRACT

A method involving exposing a substance to a promoter, the promoter being made from a liquid carrier and a metal salt component, the metal salt component, having at least (i) a magnetic susceptibility above 1000 or (ii) an ionization potential below about 500 volts, or (iii) both (i) and (ii), and applying electromagnetic wave energy to the substance while the substance is in the presence of the promoter, for a period of time and at a frequency and amplification sufficient to promote the modification of at least one physical property of the substance. A related method of treating a well in a subterranean formation, a tank or a pipeline, and the well treatment promoter composition, are also described.

22 Claims, 2 Drawing Sheets

(56) References Cited

U.S. PATENT DOCUMENTS

| | | |
|---|---|---|
| 6,691,779 B1 | 2/2004 | Sezginer et al. |
| 6,707,307 B1 | 3/2004 | McFarlane et al. |
| 6,755,246 B2 | 6/2004 | Chen et al. |
| 6,766,141 B1 | 7/2004 | Briles et al. |
| 6,771,080 B2 | 8/2004 | Conrads et al. |
| 6,819,112 B2 | 11/2004 | Gianzero et al. |
| 6,877,556 B2 | 4/2005 | Wittle et al. |
| 7,009,393 B2 | 3/2006 | Cohen Addad et al. |
| 7,055,599 B2 | 6/2006 | Kasevich |
| 7,091,460 B2 | 8/2006 | Kinzer |
| 7,109,457 B2 | 9/2006 | Kinzer |
| 7,115,847 B2 | 10/2006 | Kinzer |
| 7,135,870 B2 | 11/2006 | Mohajer et al. |
| 7,193,420 B2 | 3/2007 | Chen et al. |
| 7,221,169 B2 | 5/2007 | Jean et al. |
| 7,274,996 B2 | 9/2007 | Lapinski et al. |
| 7,312,428 B2 | 12/2007 | Kinzer |
| 7,331,385 B2 | 2/2008 | Symington et al. |
| 7,350,568 B2 | 4/2008 | Mandal et al. |
| 7,360,596 B2 | 4/2008 | Steinbrecher et al. |
| 7,398,823 B2 | 7/2008 | Montgomery et al. |
| 7,407,589 B2 | 8/2008 | Holland |
| 7,441,597 B2 | 10/2008 | Kasevich |
| 7,445,041 B2 | 11/2008 | O'Brien |
| 7,461,693 B2 | 12/2008 | Considine et al. |
| 7,486,248 B2 | 2/2009 | Halek et al. |
| 2002/0010373 A1 | 1/2002 | Komata et al. |
| 2003/0178195 A1 | 9/2003 | Agee |
| 2004/0154792 A1 | 8/2004 | Bofto |
| 2005/0024284 A1 | 2/2005 | Halek et al. |
| 2006/0180304 A1 | 8/2006 | Kasevich |
| 2006/0254766 A1 | 11/2006 | Richard et al. |
| 2007/0108202 A1 | 5/2007 | Kinzer |
| 2007/0131591 A1 | 6/2007 | Pringle |
| 2007/0215613 A1 | 9/2007 | Kinzer |
| 2007/0289736 A1 | 12/2007 | Kearl et al. |
| 2008/0073079 A1 | 3/2008 | Tranquilla et al. |
| 2008/0087099 A1 | 4/2008 | Allenberg et al. |
| 2008/0156483 A1 | 7/2008 | Zhuravlev et al. |
| 2008/0314730 A1 | 12/2008 | Pringle |
| 2009/0283257 A1 | 11/2009 | Becker |

FOREIGN PATENT DOCUMENTS

| | | |
|---|---|---|
| WO | WO 2009143061 A1 | 11/2009 |
| WO | WO 2009151891 A2 | 12/2009 |
| WO | WO 2010090659 A1 | 8/2010 |

OTHER PUBLICATIONS

Bennion, D. Brant, "An Overview of Formation Damage Mechanisms Causing a Reduction in the Productivity and Injectivity of Oil and Gas Producing Formations", Journal of Canadian Petroleum Technology, Nov. 2002, vol. 41, No. 11, p. 10-15.

"ClearWELL™ Technology Keeps Scale and Parrafin in Their Place-in Solution", article from W Magazine, a publication of Weatherford International, Ltd., Feb. 2007, vol. 9, No. 1, p. 22 (3 pages).

"Cracking an Oil Supply", The Engineer, Feb. 26, 2007; website http://www.theengineer.co.uk/news/cracking-an-oil-supply/298409.article (2 pages).

Crawford, Peter M., et al., "New approaches overcome past technical issues", Oil and Gas Journal, Jan. 26, 2009, p. 44-49.

Denney, Dennis, "Technology Applications", Journal of Petroleum Technology, Apr. 2007, vol. 59, No. 4 (4 pages).

Jamaluddin, A.K.M., et al., "Application of Heat Treatment to Enhance Permeability in Tight Gas Reservoirs", Journal of Canadian Petroleum Technology, Nov. 2000, vol. 39, No. 11, p. 19-24.

Literature Pamphlet by National Energy Technology Laboratory, "A Literature Review on Cold Cracking of Petroleum Crude Oil", Energy Policy Act of 2005 Section 1406, Jul. 2006, 30 pages.

Moore, Samuel K, "You Tell Us: Electron Beams Zap Oil to Pump More Petrol", IEEE Spectrum Online, Jan. 2007 (2 pages).

"Standard Test Method for Pour Point of Petroleum Products", ASTM International, Designation: D97-04, 2004 (10 pages).

* cited by examiner

ELECTROMAGNETIC WAVE TREATMENT METHOD AND PROMOTER

TECHNICAL FIELD

This disclosure pertains to the technical field of electromagnetic wave treatment of substances in order to modify physical properties of the substances, for instance in relation to subterranean well formation treatment methods for stimulating or facilitating well production, and compositions useful in such treatment methods.

THE INVENTION

From the beginning of the business of oil and gas production, paraffin waxes and asphaltenes have been a source of problems for the producer. These organic materials have plugged production tubing, transfer lines and pipelines for as long as there have been oil wells. The situation is nearly the same today as it has been in the past because of the nature of treatments used to prevent deposition, buildup and plugging of well equipment and reservoirs. These treatment methods are mainly centered around crystal modifiers which are polymeric esters made from long chain hydrocarbon sources and copolymers produced from ethylene and vinyl acetate. These products are very effective in preventing paraffin deposits and gelation of crude streams, but they are limited in their composition because of the limited chain lengths of starting fatty alcohols produced by suppliers. These crystal modifiers also have several other disadvantages among which are price of the finished product, poor physical properties (e.g., they freeze under even mildly low temperatures) and difficulty in pumping. Ingenious methods are required to produce crystal modifiers that are liquid at temperatures below −40° F., which are not uncommon in many areas where crude oil is produced. Emulsions, suspensions, and dilutions are often used to lower the pour point of the crystal modifier additives.

Asphaltenes are different in physical properties and composition than paraffin waxes. Waxes have a clearly defined melting point while asphaltenes do not. Asphaltenes are amorphous masses of highly aromatic character that have no clearly defined melting point or structure. The treatment of asphaltenes has been handled traditionally by using suspending agents to re-suspend these amorphous macro agglomerations and until now, little has been done successfully to prevent their deposition in the oil well environment. Thus the situation has been particularly dire for the producer when it comes to asphaltene treatment.

A fairly recent invention by the present inventor has enabled the treatment of substances, and in particular hydrocarbon-based substances found in oil and gas wells in subterranean formations, with electromagnetic waves at relatively low power levels to modify one or more physical properties of the substances in situ. That invention has been described in my previously filed patent application published as U.S. Patent Appl. Publication 2009/0283257 and PCT Appl. Publication WO 2009/143061, the disclosures of which are incorporated herein by reference. The equipment and conditions of use under which electromagnetic waves (i.e., radio waves and/or microwaves) are applied to the target substance are as taught in the above-referenced disclosures, and for the sake of brevity will not be repeated here. In its application to oil and gas production from subterranean well formations, my prior invention enables, amongst other things, the restoration of meaningful production levels in oil and gas wells which were previously far less productive due to, e.g., paraffin wax buildup or other physical and/or chemical phenomena resulting in reduced levels of production.

However, I have now surprisingly discovered that the benefits of my previous invention may be further enhanced through the use of a metal salt promoter composition in conjunction with the electromagnetic wave treatment system and method. Without being bound to theory in any way, it is believed that the introduction of the promoter to the substance (s) targeted for electromagnetic wave treatment further enhances the effectiveness of the electromagnetic wave treatment, especially when particular metals (e.g., metals which otherwise meet the requirements of the metal(s) of the promoter described herein) are substantially absent from, or are found only in very small amounts in, the substance being targeted for treatment and/or its surrounding environment or geological formation.

Thus, in one aspect of the invention there is provided a method which comprises exposing a substance to a promoter, the promoter being comprised of a liquid carrier and a metal salt component, the metal salt component at least having (i) a magnetic susceptibility above 1000 or (ii) an ionization potential below about 500 volts, or (iii) both (i) and (ii), and applying electromagnetic wave energy to the substance while the substance is in the presence of the promoter and for a period of time and at a frequency and amplification sufficient to promote the modification of at least one physical property of the substance.

Another aspect of this invention provides a method of stimulating an oil or gas well in a subterranean formation in order to increase production of oil and/or gas from the well. The method comprises
- introducing a promoter to the tank, pipeline, well, or a portion of the formation proximate to the well, wherein the promoter is comprised of a liquid carrier and a metal salt component, the metal salt component having at least (i) a magnetic susceptibility of above 1000 or (ii) an ionization potential below about 500 volts, or (iii) both (i) and (ii), and
- applying electromagnetic wave energy to at least the tank, the pipeline, the well, or a portion of the formation proximate to the well, while the tank, pipeline, well or portion of the formation proximate to the well is in the presence of the promoter and for a period of time and at a frequency and amplification sufficient to promote the modification of at least one physical property of a substance within the tank, pipeline, well or formation.

Yet another aspect of the invention provides a well treatment promoter comprising a liquid carrier and a metal salt component, the metal salt component comprising one or more metal salts, the metal salt component having at least a magnetic susceptibility above 1000, and the liquid carrier comprises a polar aprotic solvent. Still another aspect of the invention is a well treatment promoter comprising a liquid carrier and a metal salt component, the metal salt component comprising one or more metal salts, the metal salt component having at least an ionization potential below about 500 volts.

These and other aspects, features and advantages of the present invention shall become even further apparent from the following detailed description, including the examples, appended figures and accompanying claims.

FURTHER DETAILED DESCRIPTION OF THE INVENTION

Figure 1:
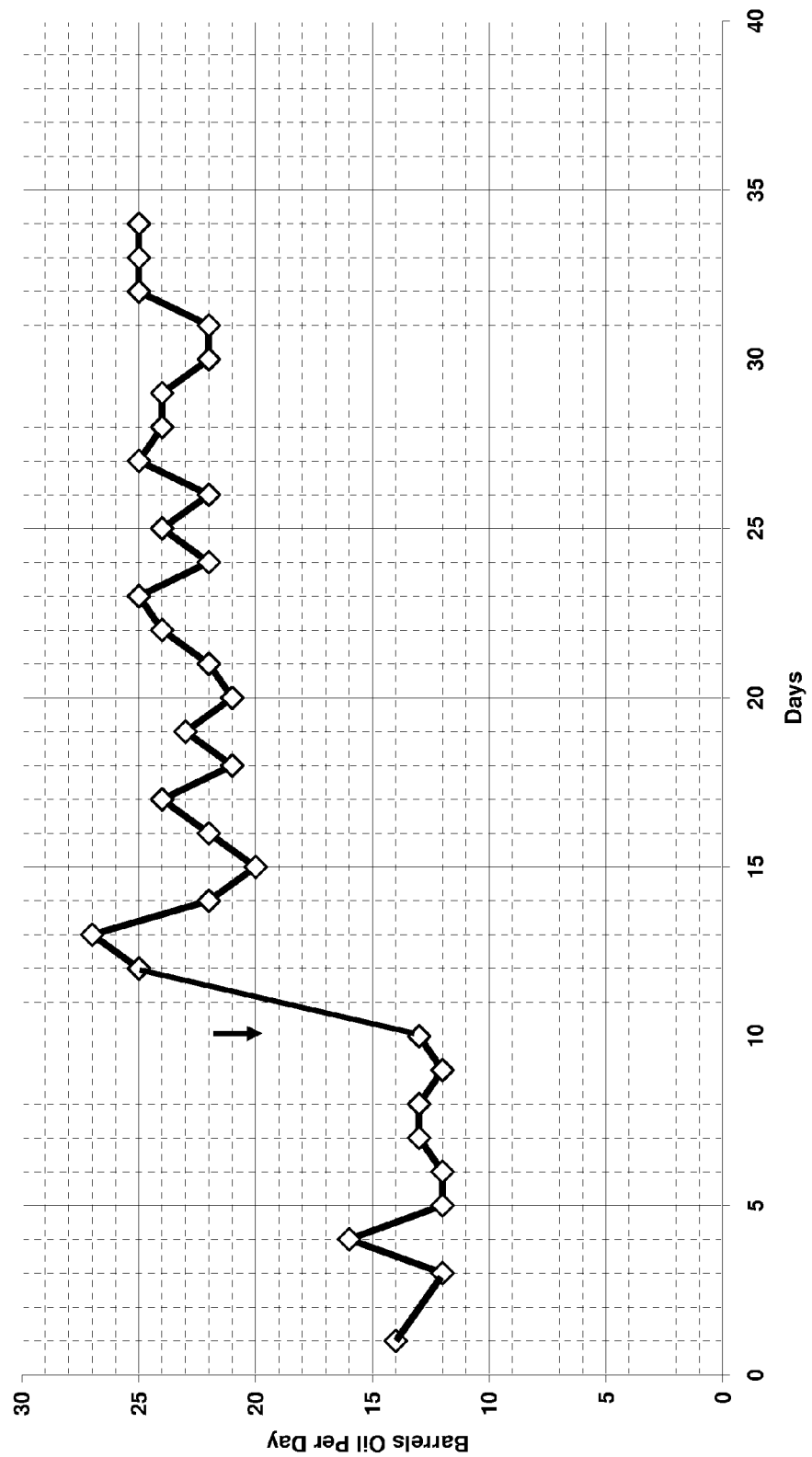
FIG. 1 is graph of oil well production data over time, showing the effects of treatment in accordance with one embodiment of the invention, as described in Experiment No. 5 below.

The present invention employs a promoter composition to enhance the effectiveness of electromagnetic wave energy in modifying one or more physical characteristics of the target substance exposed to the electromagnetic waves. The invention is particularly suitable when seeking to modify, for example, pour point or viscosity of a hydrocarbon-containing substance in order to, for example, influence a physical structure or characteristic of paraffin deposits, influence a physical structure or characteristic of asphaltene agglomerates, demulsify crude oils, and the like.

The promoter of the invention is formed by bring together a suitable liquid carrier and a metal salt component. The liquid carrier is typically comprised of an aprotic polar solvent. Examples of suitable aprotic polar solvents include N-methyl-2-pyrolidone, dimethylformamide, acetone, dimethylsulfoxide, or a mixture of any two or more of the foregoing, and the like. In some aspects of the invention, a particularly suitable aprotic polar solvent is N-methyl-2-pyrolidone. When the salt is in the form of an organic metal salt, the liquid carrier may alternatively, or in addition, comprise an organic solvent such as, e.g., xylene. In all cases, the amount of solvent present in the promoter composition can vary widely, will typically be about 70 to about 90 percent by weight, and can be more or less than this amount, as long as the amount present is sufficient to dissolve the metal salt component and achieve the desired promoter function under the conditions of treatment employed.

The metal salt component of the promoter may be a single metal salt, or a combination of two or more metal salts. It can be an inorganic, or an organic, metal salt. Suitable candidate metal salt components preferably have (i) a magnetic susceptibility of above 1000 ($10^{-6}$ cgs) or (ii) an ionization potential below about 500 volts, or (iii) both (i) and (ii). In some aspects of the invention, it is preferred that each metal in the metal salt(s) has an atomic number either in the range of 23-29, inclusive, or in the range of 59-69, inclusive. Typically, the metal salts will be metal halide or metal sulfide salts, but alternatively may be metal oxide salts or metal salts formed from other acids, for example nitrate, perchlorate, phosphate, sulfate, or sulfonate salts. Non-limiting examples of suitable inorganic metal salts include cobalt II chloride, nickel II chloride hexahydrate, iron II chloride tetrahydrate, iron II sulfide, iron II oxide, chromium II oxide, manganese II chloride, and the like. Organic metal salts typically will be in the form of a polymer or an organic acid bonded to the metal.

When a combination of the metal salts is employed, relative molar ratios of the metals may play a role in the promoter's efficacy in a given application. Thus, for example, when using a cobalt salt, an iron salt and a nickel salt in the promoter, it has been found that a molar ratio of cobalt to iron to nickel in the metal salt component of about 3:1:2, respectively, is particularly effective to promote the modification of physical characteristics of paraffin wax as the target substance receiving electromagnetic wave treatment. In another aspect of the invention, it has been found in the treatment of asphaltene material that a combination of a calcium salt and a cobalt salt in the metal salt component can be particularly effective, and especially so at a molar ratio of calcium to cobalt of about 1:1. Although not a requirement, the salt combinations typically are made up of atoms with 4 to 8 coordination numbers, and are hexahedral crystals in particular embodiments of the invention.

The amount of metal salt component in the promoter composition relative to the liquid carrier can vary widely. Typically the amount of the metal salt component will be about 10 to about 30 percent by weight, but can be more or less than this amount, as long as the amount present is sufficient to achieve the desired promoter function under the conditions of treatment employed. The carrier and metal salt component may be brought together in any order of addition or co-fed to a vessel, e.g., at ambient temperature, and mixed or agitated so that the salt component is sufficient dissolved in the carrier to form a solution.

The target substance to be treated can vary widely, but typically will include hydrocarbonaceous material and will more typically will include hydrocarbon-containing materials associated with oil and gas production and their location within well bores, formations, pipelines, storage tanks, and the like. Some examples of such hydrocarbon-containing material include paraffin wax, such as a moderate to heavy wax in the range of $C_{18}H_{38}$-$C_{60}H_{122}$), asphaltene, calcium salts of naphthenic acid, and the like.

To expose the target substance to the promoter, the promoter composition, over and above whatever secondary substances are present naturally, will be introduced thereto by placing the promoter into direct contact with at least a portion of the target substance, or is sufficiently in the proximity of the target substance such that the promoter material promotes a change in a physical characteristic of the target substance upon treatment with the electromagnetic wave energy. In a subterranean well formation, for example, such an exposure will be carried out by pumping or otherwise physically injecting the promoter composition, in liquid form, into the well bore or casing, so that at least some amount of the target substance present down hole comes into contact with the promoter composition during or prior to electromagnetic wave treatment of such substance. Circulation of the pumped and injected material within the well is desirable to ensure adequate distribution of the promoter composition within the well of formation. The duration of pumping can also vary widely and depend upon the particular characteristics of the well and formation, for example, but preferably will be at least about 1 to 2 hours in a conventional oil well. When treating a well or well formation, the amount of promoter introduced may vary, but typically should be sufficient to provide preferably at least about 200 ppm of the promoter solution relative to the production volume, expressed as barrels per day, for the day of treatment. For tanks or pipelines or similar structures, it may be desirable to spray or otherwise inject the promoter composition so that at least a portion of the target substance comes into contact with at least a portion of the promoter composition.

As noted from the previously cited prior publication references regarding my earlier invention, the electromagnetic wave energy comprises either radio wave or microwave energy, or both. When employing radio wave energy, it is supplied at a frequency in the range of 1 to 900 MHz. When employing microwave energy, it is supplied at a frequency in the range of about 20 to about 40 GHz. Preferably, the microwave frequency generator produces electromagnetic waves having a frequency range of about 20 GHz to about 30 GHz. Most preferably, the microwave frequency generator produces electromagnetic waves having a frequency range of at least about 24 GHz. Preferably, the electromagnetic wave energy is amplified to no more than about 1000 Watts of total power. It has surprisingly been found that the invention is quite effective without relying upon power-generated heat and without the associated costs associated with more significant amplification power usage.

The substance so exposed to the promoter is treated with the electromagnetic waves while the substance is in the presence of the promoter and for a period of time, and at a frequency and amplification, sufficient to promote the modification of at least one physical property of the substance. The substance is "in the presence of" the promoter when a quantifiable amount of promoter is physically placed into contact with at least a portion of the substance, or is sufficiently in the proximity of the target substance such that the promoter material promotes a change in a physical characteristic of the target substance upon treatment with the electromagnetic wave energy. The amount of time during which this exposure is carried out can vary widely, and may be dependent upon the amount and characteristics of the target substance being treated, as well as the frequencies and amplification employed. For hydrocarbon-containing substances using 46.4 MHz electromagnetic waves in the range of 200-250 Watts, the amount of treatment time is preferably about 2 to about 5 hours, and is preferably about 2 to about 2.5 hours. The treatment times may be continuous or carried out in periodic intervals. The physical properties of the substance treated may vary widely, but typically can include, for example, viscosity, liquification of solid material, and the like.

Particular embodiments of the invention will now be illustrated experimentally.

EXPERIMENTAL

Experiment No. 1

The following Table 1 specifies materials used in this experiment.

TABLE 1

| Chemical Raw Material | Grams | Weight Percent | Comments |
| --- | --- | --- | --- |
| Toluene or Xylene | 434 | 52.05 | Technical grade Toluene or Xylene |
| Dimethyl-formamide (DMF) | 144.7 | 17.36 | Technical grade |
| Priamine 81-R | 36.2 | 4.34 | Rohm Haas |
| Acrylamido-2 methylpropane sulfonic acid (AMPS) | 94.05 | 11.28 | Sigma Aldrich (once in heat to 60 C. with air sparge and mix till clear |
| Vinyl Acetate | 101.31 | 12.15 | Added rapidly with good agitation followed closely by metal salts addition |
| Cobalt Chloride | 5.08 | 0.61 | Pull a vacuum to de-airate and place nitrogen blanket on and hold until reaction complete |
| Nickel Sulfate Hexahydrate | 9.33 | 1.12 | Temperature @ 98° C. |
| Ferrous Chloride Tetrahydrate | 2.16 | 0.26 | Premix Metal Salts and add all at the same time |
| Ferrous Sulfate Heptahydrate | 2.16 | 0.26 | Premix Metal Salts and add all at the same time |
| Azo-biscyano vallaric acid Initiator | 0.14 | 0.016 | Premix Metal Salts and add all at the same time |

TABLE 1-continued

| Chemical Raw Material | Grams | Weight Percent | Comments |
| --- | --- | --- | --- |
| Azo-biscyano vallaric acid Initiator | 0.51 | 0.061 | Raise Temperature to 110° C. and hold until reaction completed |
| T-butyl Peroxide | 1.2 | 0.11 | Total time after initiator 2 hrs. |

Abbreviations used herein are as defined in Table 1 above.

Organo-Metallic Polymer/Metal Salt Promoter Production:

To a 1 liter three neck reactor (plant reactor 50 to 200 gallon) add toluene or xylene, DMF, Priamine 81R and AMPS and mix until clear. After the reaction contents have all gone into solution add the Vinyl Acetate and again mix well. Pull a vacuum while agitating and heating to 60° C. and then pull a second vacuum decanting into a toluene or xylene filled receiver water of reaction and oxygen. Release vacuum and add pre-mixed metal salts and add a nitrogen blanket. While under nitrogen and good mixing allow the metal salts to go into solution (approximately 15 minutes). After adding all the metal salts charge the first of three initiator charges and with good mixing heat to 90° C. and hold for 30 minutes. Allow the reaction to continue for the 30 minutes stipulated above and then raise temperature to 100° C. and hold for an additional 2 hours. Cool the reactor and contents to 30° C. and transfer to shipment containers.

Electromagnetic Wave Treatment Using Promoter:

The settings for the electromagnetic wave treatment used were 200 Watts power, frequency 46.4 MHz, 2 hour (7200 seconds) application period, using a mono-pole antenna with well structure as ground plane. The laboratory settings are the same 200 Watts power, frequency 46.4 MHz, 2 hour irradiation period, using a mono-pole antenna (in a coil configuration vs. a straight configuration employed in the field tests noted below), and 2 inch thick steel test chamber as the ground plane. The sample of treated and untreated waxy crude oil was placed in the center of the coil and with the settings above irradiated for two hours. Treatment of the sample with the promoter is accomplished by heating the waxy crude oil until it is liquid or to 60° C., and adding the necessary part per million dose of the promoter (based on oil quantity) to the sample, shaking well (100 shakes minimum) and irradiating as above. The promoter solution had approximately an 18 wt % concentration of the metal salt component.

The electromagnetic waves were generated using Anritsu Frequency Generator (100 KHz to 40 GHz) coupled to a 200 Watt RF power amplifier with adjustable power level (dBs).

Once the sample/s were irradiated, they were removed from the treatment chamber and subjected to the ASTM D-97-04 pour point test, for viscosity measurement using a Brookfield viscometer. The results are summarized below in Table 2. As used therein, "25/75 vol. %" refers to the relative volume percent of diesel to the indicated crude oil. The base oil tested either was with or without promoter present in the indicated amounts, and the names of the base oil have no particular significance, but indicate that they were derived from a particular oil well production stream.

TABLE 2

| Sample Name | Base Oil Tested | Viscosity cP | PPM Promoter | Electromagnetic Wave Treatment? | Comments |
|---|---|---|---|---|---|
| #1 | 25/75 vol. % Vietnam Dragon Field | Solid | 3000 | Yes | Appears to be an over treat |
| #2 | 25/75 vol. % Vietnam Dragon Field | Solid | 1500 | Yes | Appears to be an over treat |
| #3 | 25/75 vol. % Vietnam Dragon Field | Solid | 2000 | Yes | Appears to be an over treat |
| #4 | 25/75 vol. % Vietnam Dragon Field | 124 | 1000 | Yes | Very Liquid at Room Temperature |
| #5 | 25/75 vol. % Vietnam Dragon Field | 106 | 500 | Yes | Very Liquid at Room Temperature |
| #6 | 25/75 vol. % Vietnam Dragon Field | 118 | 200 | Yes | Very Liquid at Room Temperature |
| #7 | 25/75 vol. % Vietnam Dragon Field | 84 | 80 | Yes | Very Liquid at Room Temperature |
| #8 | 25/75 vol. % Vietnam Dragon Field | Solid | 40 | Yes | Solid not pouring (may be undertreat) |
| #9 | 25/75 vol. % Vietnam Dragon Field | 136 | 300 | Yes | Very Liquid at Room Temperature |
| #10 | 25/75 vol. % Vietnam Dragon Field | 108 | 200 | No | Very Liquid at Room Temperature |
| #11 | 25/75 vol. % Vietnam Dragon Field | 136 | 150 | Yes | Very Liquid at Room Temperature |
| #12 | 25/75 vol. % Vietnam Dragon Field | 110 | 100 | Yes | Extremely Liquid at Room Temperature |
| #13 | 25/75 vol. % Vietnam Dragon Field | 108 | 50 | Yes | Extremely Liquid at Room Temperature |
| #14 | 25/75 vol. % Vietnam Dragon Field | 106 | 40 | No | Extremely Liquid at Room Temperature |

As can be seen from the data in the above Table 2, there is a correlation between the amount of promoter present and the resulting viscosity of the treated samples.

Experiment No. 2

The following Table 3 specifies materials used in the Experiment No. 2 described below:

TABLE 3

| Raw Material | Grams | Weight Percent | Comments |
|---|---|---|---|
| Dimethyl-formamide (DMF) | 200 | 29.74 | |
| Acrylamido-2 methylpropane sulfonic acid (AMPS) | 47.81 | 7.11 | Pull a vacuums to de-airate and place nitrogen blanket on and hold until reaction complete |
| Sodium Vinylbenzene sulfonate | 47.81 | 7.11 | After adding all three components Begin heating to 60 C. with mixing |
| Cobalt Chloride | 8.82 | 1.311 | All metal salts are premixed and added at one time. |
| Nickel sulfate Hexahydrate | 8.82 | 1.311 | All metal salts are premixed and added at one time. |
| Ferrous Chloride Tetrahydrate | 2.52 | 0.37 | All metal salts are premixed and added at one time. |
| Toluene or Xylene | 277.51 | 41.26 | |
| Styrene | 78.39 | 11.47 | Temperature @ 98 |
| t-butyl Peroxide | 0.8 | 0.1189 | After adding t-butyl peroxide raise temperature to 110 C. and hold 2 hours |

Abbreviations used herein are as defined in Table 3 above.

Organo-Metallic Polymer/Metal Salt Promoter Production:

To a 1 liter three neck reactor (plant reactor 50 to 200 gallon) add DMF, AMPS and metal salts and mix until clear. After the reaction contents have all gone into solution add the toluene (xylene) and styrene and again mix well. Pull a vacuum while agitating and heating to 60° C. and then pull a second vacuum decanting into a toluene or xylene filled receiver water of reaction and oxygen. Add the initiator charge and with good mixing heat to 90° C. and hold for 30 minutes. Allow the reaction to continue for the 30 minutes stipulated above and then raise temperature to 100° C. and hold for an additional 2 hours. Cool the reactor and contents to 30° C. and transfer to shipment containers.

Electromagnetic Wave Treatment Using Promoter:

Same as above in Experiment No. 1. Once the sample/s were irradiated, they were removed from the treatment chamber and subjected to the ASTM D-97-04 pour point test, for viscosity measurement using a Brookfield viscometer. The results are summarized below in Table 4. As used therein, the Base Oil Tested was present in a 25 to 75 vol. % ratio of diesel fuel to the indicated crude oil. The base oil tested either was with or without promoter present in the indicated amounts, and the names of the base oil have no particular significance, but indicate that they were derived from a particular oil well production stream.

TABLE 4

| Sample Name | Base Oil Tested | Viscosity cP | PPM Promoter | RF Treat? Yes/No | Comments |
|---|---|---|---|---|---|
| #1 | Blank Untreated Oil | 1780 | 0 | Yes | Very Viscous |
| #2 | Gamma Prime (g') | 234 | 1000 | Yes | Very Liquid at Room Temperature |
| #3 | Sigma (S) | Not enough sample | 1000 | Yes | Visual viscosity appears same as #2 |

TABLE 4-continued

| Sample Name | Base Oil Tested | Viscosity cP | PPM Promoter | RF Treat? Yes/No | Comments |
|---|---|---|---|---|---|
| #4 | Gamma Prime "Darby Oil" | 232 | 2000 | Yes | Very Liquid at Room Temperature |
| #5 | Gamma Prime (g') "Darby Oil" | 302 | 2000 | Yes | Very Liquid at Room Temperature |
| #6 | Gamma Double Prime (g")"Darby Oil" | 232 | 800 | Yes | Very Liquid at Room Temperature |
| #7 | Gamma Prime (g') "Darby Oil" | 292 | 1800 | Yes | Very Liquid at Room Temperature |
| #8 | DU Oil | Not enough sample | 2000 | Yes | |
| #9 | DU Oil Gamma Prime (g') | 240 | 2000 | Yes | Very Liquid at Room Temperature |
| #10 | DU Blank | To hard/solid | 0 | No | Visual viscosity Completely Solid |
| #11 | Gamma (g) Synthetic 1 | 60 | 1000 | Yes | Very Liquid at Room Temperature |
| #12 | Gamma Double Prime(g") Synthetic 1 | 6.0 | 1000 | Yes | Extremely Liquid at Room Temperature |
| #13 | Gamma Double Prime(g") Synthetic 1 | 16.0 | 2000 | Yes | Extremely Liquid at Room Temperature |
| #14 | Synthetic 1 Blank | To hard | 0 | No | Solid at Room Temperature |
| #15 | Dragon Field Viet Nam Gamma Double Prime(g") | 720 | 10 | Yes | 1st Successful Treatment of this Oil (ever) |
| #16 | Gulf Wax 30% active Gamma Double " | 80 | 800 | Yes | Very Liquid at Room Temperature |
| #17 | Blank Gulf Wax 30% | To hard | 0 | Yes | Solid @ Room Temperature |
| #18 | Blank Gulf Wax 30% | To hard | 0 | No | Solid @ Room Temperature |
| A | Synthetic 1 Wax Added Gamma (g) | Solid | 800 | No | Pour Point 92° F. |
| B | Synthetic 1 Wax Added Gamma (g) | Solid | 1200 | Yes | Pour Point 88.7° F. |
| C | Synthetic 1 Wax Added Gamma (g) | Solid | 1600 | Yes | Pour Point 85° F. |
| D | Synthetic 1 Wax Added Gamma (g) | Solid | 1600 | No | Pour Point 82° F. |
| E | Synthetic 1 Wax Added Gamma (g') | Solid | 800 | Yes | Pour Point 93° F. |
| F | Synthetic 1 Wax Added Gamma (g') | 126 | 800 | Yes | Pour Point 79° F. |
| G | Synthetic 1 Wax Added Gamma (g') | 100 | 1200 | Yes | Pour Point 64° F. |
| H | Synthetic 1 Wax Added Gamma (g') | Solid | 1600 | No | Pour Point 92° F. |
| I | Synthetic 1 Wax Added Gamma (g") | Solid | 800 | Yes | Pour Point 89° F. |
| J | Synthetic 1 Wax Added Gamma (g") | 60 | 1200 | Yes | Pour Point 64° F. |
| K | Synthetic 1 Wax Added Gamma (g") | 79 | 1600 | Yes | Pour Point 66° F. |
| L | Synthetic 1 Wax Added Gamma (g") | Solid | 1600 | No | Pour Point 92° F. |
| M | Synthetic 1 Blank | 2314 | 0 | No | Pour Point 95° F. |
| N | Synthetic 1 Blank | 1829 | 0 | Yes | Pour Point 95° F. |

As can now be appreciated from the foregoing experimental results, treatment of the samples with electromagnetic radio waves in the presence of the metal promoter composition over a 2 hour period resulted in promoted liquification of the solid waxy oil and/or improved reduction in viscosity of treated oil.

Experiment No. 3

On further examination it was found that the use of simple blends of the transition metal salts and the rare earth metal salts could affect the same alterations of the physical nature of the crude oil as the organo-metal salt polymers. It was also found that the blending of various ratios of the individual transition metal salts and rare earth metal salts could produce the same desired effects of the polymeric versions.

Several metal salt blends, using N-methyl-2 pyrrolidone as the liquid carrier, as well as the individual metal salts were tested for promotional activity on two high wax, high pour point (97° F. and 86° F., respectively) crude oils treated with the electromagnetic wave energy. The radio wave treatment was carried out under 200 Watts power, frequency 46.4 MHz, 2 hour (7200 seconds) application period, using a mono-pole antenna using the well structure as ground. Each sample underwent an ASTM D-97-04 pour point test, for viscosity measurement using a Brookfield viscometer. The results of these tests are presented in Table 5 below.

TABLE 5

| Metal Salts | Promoter Parts per Million (PPM) | Pour Point (° F.) after Chemical | Pour Point (° F.) after RF |
|---|---|---|---|
| | | Oil #1 Pour Point (° F.) Untreated | |
| None | 0 | 97 | n/a | 97 |
| Cobalt Chloride | 200 | 89 | 89 | 38 |
| Nickel Chloride | 200 | 89 | 89 | 41 |
| Iron II Chloride | 200 | 89 | 89 | 40 |
| * Dysproesium Chloride | 20 | 89 | 89 | 30 |
| * Gadolinium Chloride | 20 | 89 | 89 | 32 |
| Cobalt/Nickel Chlorides (Co/Ni) 15 wt %:15 wt % | 200 | 89 | 89 | 33 |
| Cobalt/Iron Chlorides (Co/Fe) 15 wt %:15 wt % | 200 | 89 | 89 | 37 |
| Cobalt/Iron/Nickel Chlorides (Co/Fe/Ni) (10% wt:10% wt:10 wt %) | 200 | 89 | 89 | 26 |
| Cobalt/Iron/Nickel (Co/Fe/Ni) (10 wt %:12 wt %:8 wt %) | 200 | 89 | 89 | 40 |
| | | Oil #2 Pour Point (° F.) Untreated | |
| none | 0 | 86 | n/a | 86 |
| Cobalt/Iron/Nickel (Co/Fe/Ni) (15 wt %:5 wt %/10 wt %) | 200 | 97 | 97 | 64 |
| Cobalt/Nickel Chlorides (Co/Ni) 15 wt %:15 wt % | 200 | 97 | 97 | 77 |
| Cobalt/Iron Chlorides (Co/Fe) 15 wt %:15 wt % | 200 | 97 | 97 | 72 |
| Cobalt/Iron/Nickel Chlorides (Co/Fe/Ni) (10 wt %:10 wt %:10 wt %) | 200 | 97 | 97 | 75 |
| Cobalt/Iron/Nickel (Co/Fe/Ni) (10 wt %:12 wt %:8 wt %) | 200 | 97 | 97 | 74 |
| Cobalt/Iron/Nickel (Co/Fe/Ni) (15 wt %:5 wt %/10 wt %) | 200 | 97 | 97 | 60 |

Experiment No. 4

Paraffin and asphaltene testing was performed by making a mixture of two very heavy wax oils and pure asphalt from the refinery in blends of 50% waxy crude and 50% asphalt. The blended waxy crude and asphalts with #1 wax gave a blank pour point of 97° F. and 86° F., respectively. After injection of 300 PPM of the metal salt mixtures and irradiating at 46.4 MHz for two hours, the samples were allowed to cool, and ASTM D-97-04 pour points were conducted on each, for viscosity measurement using a Brookfield viscometer. Unless otherwise indicated below, the concentrations of the indicated metals were of equal proportion, on the basis of the metal itself, the metal halide salts combined being 10% by weight of the overall solution, with the remaining being N-methyl-2 pyrrolidone. Table 6 summarizes the results.

TABLE 6

| Metal Salts | Pour Point (° F.) | Metal Salts | Pour Point (° F.) |
|---|---|---|---|
| Cu/Co/Dy/Cs | 74 | Cu/Co/Dy/Cs | 63 |
| Nb/S | 76 | Nb/S | 67 |
| Sr/S | 76 | Sr/S | 70 |
| B/Sr | 76 | B/Sr | 71 |
| Cs/V/Cs | 74 | Cs/V/Cs | 70 |
| Sn/S | 72 | Sn/S | 71 |
| Dy/Co | 76 | Dy/Co | 67 |
| Cd/S | 71 | Cd/S | 70 |
| Cs/Zn | 75 | Cs/Zn | 68 |
| Al/Cs | 79 | Al/Cs | 72 |
| Sb/P | 81 | Sb/P | 69 |
| Fe/Nb | 77 | Fe/Nb | 71 |
| B/Sr | 78 | B/Sr | 68 |
| Nb/Co | 72 | Nb/Co | 63 |
| Sr/S | 76 | Sr/S | 70 |
| B/Sb | 79 | B/Sb | 65 |
| V/Ni | 83 | V/Ni | 72 |
| Mn/V | 83 | Mn/V | 74 |
| Ti/Cr | 86 | Ti/Cr | 72 |
| Ce/Zn | 80 | Ce/Zn | 74 |
| Co/Ca | 61 | Co/Ca | 46 |

Experiment No. 5

An oil well (Well No. 1) in compromised production due to paraffin and having no discernible odor of hydrogen sulfide present (indicating the substantial absence of iron sulfide) was monitored for its change in production from points in time prior to and after treatment in accordance with one embodiment of the invention. The treatment point is indicated with a down arrow in FIG. 1. The well had previously been treated with radio frequency electromagnetic waves without significant improvement in production. At the treatment point indicated, a promoter comprised of Co/Nickel/Iron chloride salts, in an 18 wt % solution with N-methyl-2 pyrrolidone, was pumped into the well and the well production containing the promoter was recirculated back to the well for period of 1 hour. The amount of promoter introduced to the well was 400 ppm based upon oil production of the treated well. An amplifier then was coupled to a straight monopole antenna in accordance with this invention, and the antenna was extended into the annulus of the well. Radio frequencies were emitted from the antenna at 46.4 MHz at a power level of 200 Watts, for a 2-hour irradiation period. The product levels thereafter were monitored daily and recorded. The resulting productions are recorded on the graph at FIG. 1. The change in production from the treatment point forward were clearly significant as compared to production numbers achieved without use of a promoter in combination with the radio frequency treatment.

Experiment No. 6

Figure 2:
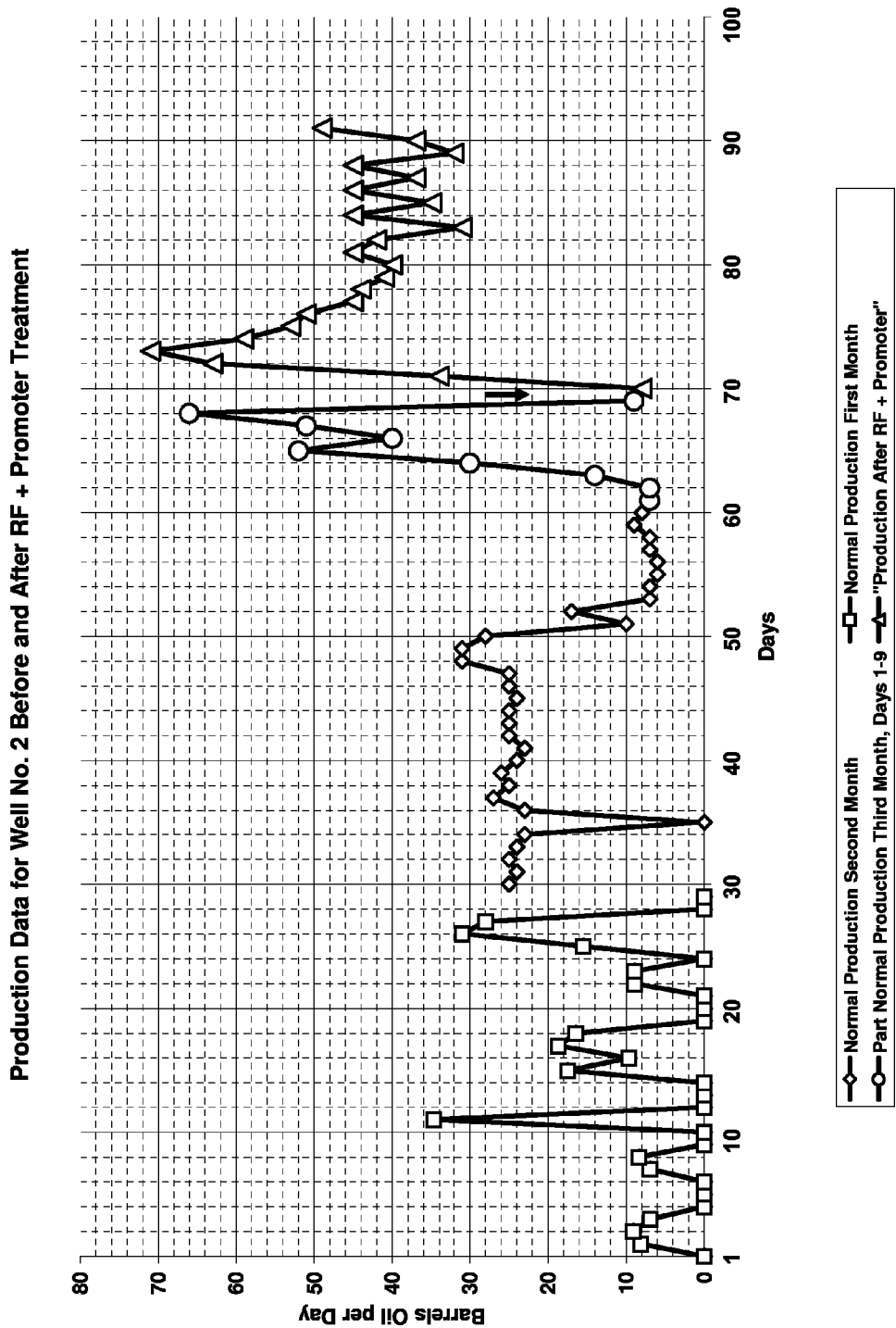
FIG. 2 is a graph of oil well production data over time, showing the effects of treatment in accordance with one embodiment of the invention, as described in Experiment No. 6 below.

An oil well (Well No. 2) in compromised production due to paraffin and having no discernible odor of hydrogen sulfide present (indicating the substantial absence of iron sulfide) was monitored for its change in production from points in time prior to and after treatment in accordance with another embodiment of the invention. The treatment point is indicated with a down arrow in FIG. 2. The well had previously been treated with radio frequency electromagnetic waves without significant improvement in production. At the treatment point indicated, a promoter comprised of combination of cobalt chloride, nickel chloride and iron chloride salts, in an 18% by weight solution with N-methyl-2 pyrrolidone, was pumped into the well and the well production containing the promoter was recirculated back to the well for period of 1 hour. The amount of promoter introduced to the well was 400 ppm based upon daily oil production of the treated well. Radio frequency treatment was conducted as described in Experiment No. 5 above. The resulting productions are recorded on the graph at FIG. 2. The third set of data just prior in time to the treatment point was anomalous, due to a well pump change during that time period. The change in production from the treatment point forward were clearly significant as compared to prior production numbers achieved without use of a promoter in combination with the radio frequency treatment.

As the foregoing experiments reveal, various combinations of metals meeting the criteria specified for promoters of this invention provide promoter compositions which enable substantial reductions in crude oil pour point when employed in conjunction with the electromagnetic wave treatment in accordance with my prior invention. Subsequent application of the promoted electromagnetic wave treatment to oil and gas wells have confirmed a significant increase in production on previously shut-in wells, or wells with documented paraffin or asphaltene production inhibition, when promoter solution was first injected to the wells prior to electromagnetic well treatment, especially when the wells tested appeared substantially free of iron sulfide.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

Unless otherwise specifically stated herein, the invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities expressly stated.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in tow into this disclosure by reference, as if fully set forth herein.

This invention is susceptible to considerable variation in its practice. While the invention has been described here in the context of down hole applications in oil and gas well treatment, it will be appreciated by those of at least ordinary skill in the art, having the benefit of the present disclosure, that the invention has applications in many other areas in which the alteration of one or more physical properties of a substance could be desirable. Therefore the foregoing description is not intended to limit, and should not be construed as limiting, the invention to the particular exemplifications presented hereinabove.

The invention claimed is:

1. A method comprising exposing a substance to a promoter comprised of a liquid carrier and a metal salt component, the metal salt component having at least (i) a magnetic susceptibility above 1000 ($10^{-6}$ cgs) or (ii) an ionization potential below about 500 volts, or (iii) both (i) and (ii), and applying electromagnetic wave energy to the substance while the substance is in the presence of the promoter, for a period of time and at a frequency and amplification sufficient to promote the modification of at least one physical property of the substance; wherein the liquid carrier comprises a polar aprotic solvent selected from the group consisting of N-methyl-2-pyrolidone, dimethylformamide, acetone, dimethylsulfoxide, or a mixture of any two or more of the foregoing.

2. A method according to claim 1, wherein metal salt component has a magnetic susceptibility above 1000 ($10^{-6}$ cgs) and the metal salt component comprises one or more metal salts, each metal having an atomic number in the range of 23-29 inclusive, or in the range of 59-69 inclusive.

3. A method according to claim 2, wherein the liquid carrier comprises a polar aprotic solvent.

4. A method according to claim 1, wherein the metal salt component comprises at least two metal salts.

5. A method according to claim 4, wherein the metal salt component comprises cobalt salt, iron salt and nickel salt.

6. A method according to claim 5, wherein the molar ratio of cobalt to iron to nickel of the metal salt component is 3:1:2.

7. A method according to claim 4, wherein the metal salt component comprises calcium salt and cobalt salt.

8. A method according to claim 7, wherein the molar ratio of calcium to cobalt is 1:1.

9. A method of treating a well in a subterranean formation, a tank or a pipeline, the method comprising introducing a promoter to the tank, pipeline, well, or a portion of the formation proximate to the well, wherein the promoter is comprised of a liquid carrier and a metal salt component, the metal salt component having at least (i) a magnetic susceptibility of above 1000 ($10^{-6}$ cgs) or (ii) an ionization potential below about 500 volts, or (iii) both (i) and (ii), and applying electromagnetic wave energy to at least the tank, the pipeline, the well, or a portion of the formation proximate to the well, while the tank, pipeline, well or portion of the formation proximate to the well is in the presence of the promoter and for a period of time and at a frequency and amplification sufficient to promote the modification of at least one physical property of a substance within the tank, pipeline, well or formation.

10. A method according to claim 9, wherein the metal salt component has a magnetic susceptibility above 1000 ($10^{-6}$ cgs) and the metal salt component comprises one or more metal salts, each metal having an atomic number in the range of 23-29 inclusive, or in the range of 59-69 inclusive.

11. A method according to claim 10, wherein the liquid carrier comprises a polar aprotic solvent.

12. A method according to claim 11, wherein the polar aprotic solvent is selected from the group consisting of N-methyl-2-pyrolidone, dimethylformamide, acetone, dimethylsulfoxide, or a mixture of any two or more of the foregoing.

13. A method according to claim 10, wherein the metal salt component comprises at least two metal salts.

14. A method according to claim 13, wherein the metal salt component comprises cobalt salt, iron salt and nickel salt.

15. A method according to claim 14, wherein the molar ratio of cobalt to iron to nickel of the metal salt component is 3:1:2.

16. A method according to claim 10, wherein the substance comprises a paraffin.

17. A method according to claim 9, wherein the metal salt component at least has an ionization potential below about 500 volts.

18. A method according to claim 17, wherein the metal salt component comprises calcium salt and cobalt salt.

19. A method according to claim 18, wherein the molar ratio of calcium to cobalt is 1:1.

20. A method according to claim 17 wherein the substance comprises asphaltene.

21. A method according to any of the preceding claims, wherein the electromagnetic wave energy comprises radio-wave energy at a frequency in the range of 1 to 900 MHz.

22. A method according to claim 21, wherein the electromagnetic wave energy is amplified to no more than about 1000 Watts of total power.

* * * * *